(12) United States Patent
Chi et al.

(10) Patent No.: US 6,907,459 B2
(45) Date of Patent: Jun. 14, 2005

(54) SYSTEMS AND METHODS FOR PREDICTING USAGE OF A WEB SITE USING PROXIMAL CUES

(75) Inventors: Ed H. Chi, Palo Alto, CA (US); Kim K Chen, Dunwoody, GA (US)

(73) Assignee: Xerox Corporation, Stamford, CT (US)

( * ) Notice: Subject to any disclaimer, the term of this patent is extended or adjusted under 35 U.S.C. 154(b) by 818 days.

(21) Appl. No.: 09/820,706

(22) Filed: Mar. 30, 2001

(65) Prior Publication Data

US 2002/0143802 A1 Oct. 3, 2002

(51) Int. Cl.[7] .......................................... G06F 15/173
(52) U.S. Cl. .................. 709/224; 715/501.1; 707/3; 707/5
(58) Field of Search ................... 709/224; 715/501.1; 707/3, 5

(56) References Cited

U.S. PATENT DOCUMENTS

| | | | | | |
|---|---|---|---|---|---|
| 5,835,905 | A | * | 11/1998 | Pirolli et al. ..................... | 707/3 |
| 5,875,446 | A | * | 2/1999 | Brown et al. .................... | 707/3 |
| 6,223,188 | B1 | * | 4/2001 | Albers et al. ............ | 715/501.1 |
| 6,285,999 | B1 | * | 9/2001 | Page .............................. | 707/5 |

OTHER PUBLICATIONS

U.S. Appl. No. 09/540,063, filed Mar. 31, 2000, Chi et al.
Chi, E.H. et al., (1998) Visualizing the Evolution of Web Ecologies. *Proceedings of the Human Factors in Computing Systems*, CHI–98 (pp. 400–407). Los Angeles, CA.
Chi, E.H. et al., (1998) An operator interaction framework for visualization systems. *Proceedings of the IEEE Information Visualization Symposium*. (pp. 63–70).
Pirolli, P. (1997) Computational models of information scent–following in a very large browsable text collection. *Proceedings of the Conference on Human Factors in Computing Systems*, CHI '97 (pp. 3–10), Atlanta, GA.
Pirolli, P. et al. (1996) Silk from a sow's ear: Extracting usable structures from the web. *Proceedings of the Conference on Human Factors in Computing Systems*, CHI '96 Vancouver, Canada.
Priolli, P. et al. (1999) Distributions of surfers' paths through the World Wide Web: Empirical characterization. *World Wide Web*, 1, 1–17.
Pitkow, J. et al. (1999 in press) Mining longest repeated subsequences to predict World Wide Web surfing. *Proceedings of the USENIX Conference on Internet*.
Pitkow, J. et al. (1997) Life, death, and lawfulness on the electronic frontier. *Proceedings of the Conference on Human Factors in Computing Systems*, CHI '97 (pp. 383–390).
Spool, J.M. et al. (1998) Measuring Website usability. *Proceedings of the Conference on Human Factors in Computing Systems*. CHI '98 (pp. 390) Los Angeles, CA.

* cited by examiner

Primary Examiner—Jack Harvey
Assistant Examiner—Hai V. Nguyen
(74) Attorney, Agent, or Firm—Oliff & Berridge, PLC

(57) ABSTRACT

Techniques are provided for predicting the usage of a document collection given proximal cue information in the documents, a starting point and the user's information needs. A document collection topology matrix is created indicating links between document content portions. The link entry documents are analyzed for proximal cue words based on link URL, surrounding text and title. For image links, the connected to document information may also be used. Proximal cue words are added to a matrix relating proximal cue words and links. The proximal scent matrix indicates a similarity between the user's information need and the proximal cue word matrix. A distal scent information matrix is also calculated using distal document information and combined with the proximal scent matrix. Spreading activation is then applied to the resulting matrix using the starting location for a requested number of iterations and resulting in a predicted usage of the document collection.

16 Claims, 6 Drawing Sheets

TOPOLOGY MATRIX T

|  | 0 JAVA | 1 API | 2 SUN | 3 HOME | 4 COFFEE | 5 Support | 6 PETE'S | 7 TEA |
|---|---|---|---|---|---|---|---|---|
| 0 |  |  | 1 | 1 |  |  |  |  |
| 1 | 1 |  |  | 1 |  |  |  |  |
| 2 | 1 |  |  |  |  | 1 |  |  |
| 3 | 1 | 1 |  |  |  |  |  |  |
| 4 |  |  |  | 1 |  |  | 1 |  |
| 5 | 1 |  |  |  | 1 |  |  |  |
| 6 |  |  |  |  |  |  |  | 1 |

LINKS

PROXIMAL CUE WORD MATRIX K

FIG. 8

SYSTEMS AND METHODS FOR PREDICTING USAGE OF A WEB SITE USING PROXIMAL CUES

INCORPORATION BY REFERENCE

This Application incorporates by reference entitled "SYSTEM AND METHOD FOR PREDICTING WEB USER FLOW BY DETERMINING ASSOCIATION STRENGTH OF HYPERMEDIA LINKS", by P. Pirolli et al., filed Mar. 31, 2000 as U.S. application Ser. No. 09/540,976; and entitled "SYSTEM AND METHOD FOR INFERRING USER INFORMATION NEED IN A HYPERMEDIA LINKED DOCUMENT COLLECTION", by E. Chi et al., filed Mar. 31, 2000 as U.S. application Ser. No. 09/540063, each in its entirety.

The U.S. Government has a paid-up license in this invention and the right in limited circumstances to require the patent owner to license others on reasonable terms as provided for by the terms of Contract No. N00014-96-C-0097 awarded by the Office of Naval Research.

BACKGROUND OF THE INVENTION

1. Field of Invention

This invention relates to predicting the usage patterns of document collections given information about a user's information needs.

2. Description of Related Art

Increasingly, the World Wide Web has become the information delivery mechanism of choice for both corporations and individuals users. The ubiquity of World Wide Web browsers and the push by many corporations to adopt common off the shelf technology (COTS) have all helped the World Wide Web become a required delivery option for most information systems.

However, although information sources are now more likely to be available to their intended audience through the World Wide Web, the access to relevant information is still limited by a user's ability to navigate the World Wide Web and the destination web site and to actively accumulate the required information. Many sites use different methods or models of site design to present the information. For example, a web site designer of a county government tax assessors office site may assume any query will be related to county tax assessment. In contrast, the web site designer for an online department store needs to provide a user with access to product information ranging from toasters to jewelry. The web site designer of an internal corporate information site may need to provide access to corporate tax information, real estate holdings, business permits and/or health and safety records. Providing an intuitive interface to facilitate user access to information repositories including web sites is therefore increasingly important for businesses and consumers.

Accordingly, Web site designers, information system managers, and researchers are constantly developing new tools to gain understanding into the paths that users follow to obtain the information they need. For example, Web site designers, researchers and web site banner advertisers seeking to place information on the most relevant web site have used a variety of techniques to analyze web log files. Web log files contain information concerning which web page referred the user to the site as well as which web pages were visited within the site. Information concerning the user's IP address and browser type is also frequently saved for review in the web log file.

Tools such as Insight from Accrue Corporation, Astra Site Manager from Mercury Interactive and WebCriteria's Site Analysis, Task Analysis and MAX products allow Web site developers to analyze general statistics about a web site. For example, WebCriteria's Site Analysis product provides descriptive statistics accumulated through the use of the MAX software agent product. The MAX software agent traverses the web site to derive usability metrics from simulated browsing. However, the simulated browsing merely provides a random walk of a web site. Simulated browsing based on a random walk assumes the user's navigational choices at any juncture are random and simply ignores the presence of informational cues on each page and surrounding each link. However, in the actual use of the site, informational cues influence a user's decision as to whether one path through the Web site is chosen over another path.

In Chakrabarti et al. and Silva et al, (Chakrabarti, S., B. Dom, P. Raghavan, S. Rajagopalan, D. Gibson and J. Kleinberg. Automatic Resource Compilation by Analyzing Hyperlink Structure and Associated Text. In Proc. of the $7^{th}$ International World Wide Web Conference (WWW7), pp. 65–74, Brisbane, Australia, 1998, and Silva, I., B. Ribeiro-Neto, P. Calado, E Moura, N. Ziviani, Link-based and Content-Based Evidential Information in a Belief Network Model. In Proc. of the $21^{st}$ ACM SIGIR Conference on Research and Development in Information Retrieval, pp. 96–103, Athens, Greece 2000), a combination of keywords and links is used to determine a ranking weight for retrieval results. However, Chakrabarti and Silva make no attempt to predict the usage of a web site based on a virtual user's information needs.

Instead, these systems merely describe how users have traversed the web site in the past. These systems fail to provide web site designers an objective prediction, useful in describing how the changes to a document or web page affect the way a user with a specific information need will traverse the site. Co-pending Application, entitled "SYSTEM AND METHOD FOR PREDICTING WEB USER FLOW BY DETERMINING ASSOCIATION STRENGTH OF HYPERMEDIA LINKS", by P. Pirolli et al., filed Mar. 31, 2000, and filed as U.S. application Ser. No. 09/540,976, incorporated in its entirety, predicts a user's traversal of the links in a document collection or web site using a computation based on the presence of information in the linked to or distal page. However, distal information is information which by definition has not yet been seen by the user. Accordingly, analysis of distal information cannot reflect an objective indication of the decisions made by an actual first time user of the document collection or web site, as the user encounters the navigational choices in the current or proximal document or web page. Instead, document collection or web site usability analysis requires including some measure of how the user's experience is affected by information cues in the proximal or current document or web page.

SUMMARY OF THE INVENTION

Accordingly, systems and methods for predicting usage of a document collection or web site, using proximal cues would be advantageous. In various exemplary embodiments according to this invention, a virtual or objective user's predicted usage of a document collection or web site using proximal cues is determined.

Various other exemplary embodiments according to this invention provide for identifying and providing proximal information cues for image links in the document collection or web site.

BRIEF DESCRIPTION OF THE DRAWINGS

Various exemplary embodiments of this invention will be described in detail, with references to the following figures, wherein:

FIG. 8 is an exemplary proximal cue word matrix according to this invention.

DETAILED DESCRIPTION OF EXEMPLARY EMBODIMENTS

Figure 1:
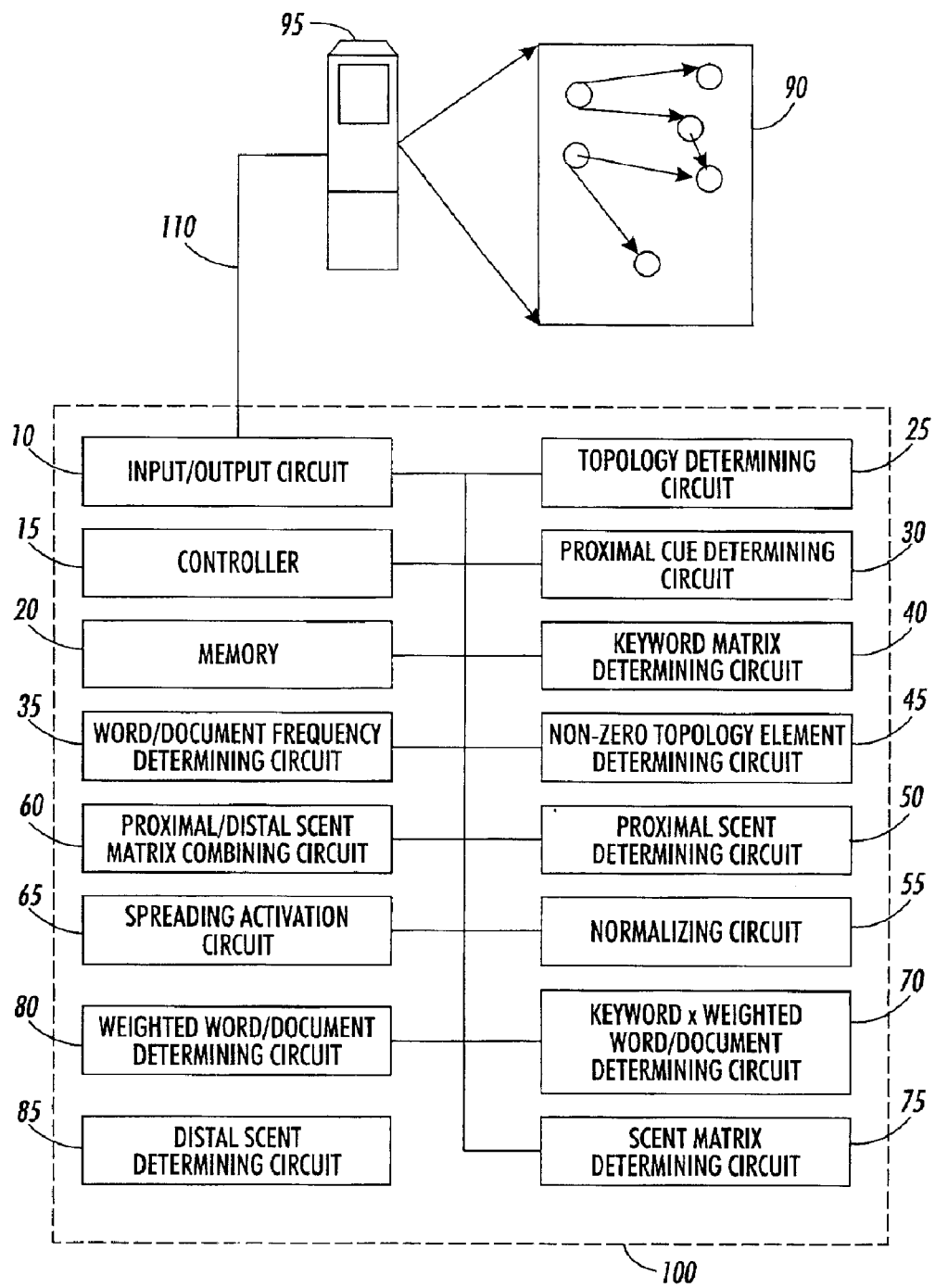
FIG. 1 is a block diagram showing an exemplary system for predicting the usage of the a web site according to this invention.

FIG. 1 shows an exemplary block diagram of a first exemplary embodiment of a system for predicting the usage of a web site 100 according to this invention. The system for predicting usage of a web site 100 includes a controller 15, a memory 20, a topology determining circuit 25, a proximal cue determining circuit 30, a word/document frequency determining circuit 35, a keyword matrix determining circuit 40, a non-zero topology element determining circuit 45, a proximal scent determining circuit 50, a normalizing circuit 55, a proximal and distal scent combining circuit 60, a spreading activation circuit 65, a scent matrix determining circuit 75, a keyword x weighted word/document determining circuit 70, a weighted word/document matrix determining circuit 80, a distal scent determining circuit 85 and an input/output circuit 10 for connecting to communications link 110. A web server 95 provides access to a document collection or web site pages 90 over communications link 110.

The input/output circuit 10 retrieves the document or web page of a web site 90 over the communication link 110 from web server 95 and stores the document or page in memory 20. The exemplary embodiment of this invention describes the use of a web server 95. However, it will be apparent that the system for predicting usage of a web site using proximal cues 100 according to this invention may be practiced using any system or method of providing access to document collections, web sites or any other type of content portions in which links, references and/or connection between the documents, web pages or content portions are provided.

As the input/output circuit 10 retrieves each document or web page in the site to be analyzed, the topology determining circuit 25 builds an exemplary topology matrix describing the links or connections between each document or web page retrieved. For purposes of description, the exemplary site shows a limited number of documents or web pages and associated links. However, any number of documents or web pages may be processed using the systems and methods of this invention.

As the input/output circuit 10 retrieves each document page of the document collection or web site 90, the topology of the document or web site is determined using the topology determining circuit 25. Each link or connection on a document or web page is then analyzed by the proximal cue analyzing circuit 30. The proximal cue analyzing circuit 30 identifies information cues that convey information to the virtual user. For example, the text associated with a link or connection may provide proximal cues as the nature of the information linked to. The proximal cue analyzing circuit 30 then breaks the link or connection down into constituent words. The proximal cue words may also include portions of the text surrounding the link. If a link or connection is in typical URL form, the punctuation and '/' characters associated with the URL are used to define word boundaries. For example, if the link or URL "http://www.xerox.com/products/support/index.html" were processed, the words http, www, xerox, com, products, support and index would all be added as proximal cue words to the keyword matrix for the relevant link. In various alternative embodiments, additional weighting factors may be added to the proximal cue word information such as the location of the link within the document or web page. For example, a weighting that accords higher importance to cues words appearing higher up in the structure of a document or web page may also be used to provide weighting information.

If the link is an image link such as a GIF, JPEG, PNG, BMP or any other image file type, the number of proximal cue words derivable from the link may be limited or non-existent. In addition, determining proximal cue words for image links is a difficult problem. If the image is analyzed, a large increase in processing time and resources will result. Also, determining the meaning or semantics of an image based on image analysis is an extremely complicated and error prone process. However, as web site developers attempt to improve the usability of their web sites, the use of image links has increased. Accordingly, it is important to include image links when determining the proximal cues a virtual or objective user responds to.

If the controller 15 determines that the stored document or web page is an image link, then the distal document or web page that is linked to the image is retrieved. In the exemplary embodiment of this invention, the proximal cue word information from the link and/or text surrounding the link are analyzed by the proximal cue calculating circuit 30. The linked to or distal document or web page may also be analyzed for proximal cue words by the proximal cue calculating circuit 30. In this way, the linked to or distal document or web page serves as a proxy to supplement or replace proximal cue word information insufficient or unavailable on the current or proximal page for the image link. In various alternative embodiments, the linked to or distal information used may include the distal document title and the document text, either alone or in combination with proximal cue information such as the cue words from the text surrounding the image link. Entries reflecting the presence of the proximal cues are then stored in the keyword matrix data structure stored in memory 20.

Once the topology determining circuit 25 has determined all the topology information for a document collection or web site, the information is stored in the exemplary topology matrix data structure stored in memory 20. The word/document frequency determining circuit 35 determines the word/document frequency of each of the relevant words in the document collection or set of web pages making up the web site 90. The weighted word/document determining circuit 80 then determines the weighted term frequency, inverse document frequency for each of the words in the document collection or web site.

The non-zero topology element determining circuit 45 then analyzes the exemplary topology matrix data structure stored in memory 20. Each of the non-zero elements of the topology matrix stored in memory 20 are then identified.

For each of the identified non-zero topology elements in memory 20, the controller 15 identifies the relevant link/document from the topology matrix. The link/document identification information is then passed to the keyword matrix determining circuit 40. The keyword matrix determining circuit 40 analyzes the proximal matrix stored in memory 20 for entries corresponding to the link/document identification information. The non-zero entries in the proximal cue word matrix entry for the link/document indicate relevant words associated with the link.

For each non-zero entry specified in the proximal cue word vector, proximal scent determining circuit 50 then determines the proximal scent by determining the similarity between each entry in the proximal cue word matrix stored in memory 20 and the user information need vector previously stored in memory 20. In the exemplary embodiments according to this invention, the similarity is determined by multiplying the proximal cue word matrix stored in memory 20 by the weighted word/document frequency matrix stored in memory 20 using proximal cue word x weighted word/document determining circuit 70 and multiplying the result by the user information need vector previously stored in memory 20. However, in various other exemplary embodiments according to this invention, any known or later developed technique of determining similarity may be employed. For example, a determination of the cosine of the angle between the vectors may be used.

The distal scent determining circuit 85 determines the distal scent matrix using information from the connected to or distal document or web pages. The connected to or distal documents or web pages provide the cue information to determine the distal scent matrix.

The proximal and distal scent combining circuit 60 is then activated to substitute the previously determined distal scent matrix entries into the proximal scent matrix when the distal scent matrix entry is non-zero and the proximal scent entry is zero. The new matrix created is called the scent matrix. In this way, distal information is provided as a substitute when there is insufficient proximal information. It will be apparent that other techniques of determining the proportions of proximal and distal scent to be combined are within the scope of this invention. For example, the relationship:

$$\text{Scent}=\text{ALPHA}*(\text{Proximal\_Scent})+\text{BETA}*(\text{Distal\_Scent}) \quad (1)$$

might be used.

The normalizing circuit 55 is then activated to create a normalized scent matrix in which the columns of the scent matrix sum to one. This reflects that the sum of all probabilities for a user navigation choice at that particular point is one. Each entry reflects the likelihood that a user with the specified information need will choose the associated path.

The controller 15 then selects the initial or starting page vector E previously stored in memory 20. The initial or starting page vector reflects the first document or page the virtual or objective user selects in traversing the document collection or web site. The first document or page may reflect any document or page within the document collection or web site. The spreading activation circuit 65 is then initialized with the number of iterations to be run. After the specified number of iterations, the matrix is analyzed. The matrix entries reflect the likelihood the virtual or objective user will arrive at the indicated location.

As a web site designer changes the document collection or web site, an objective indication of the document collection or web site usability can be generated. In this way the web site designer can interactively adjust the design of a web site and develop better techniques to deliver the desired information to the target audience.

Figure 2:
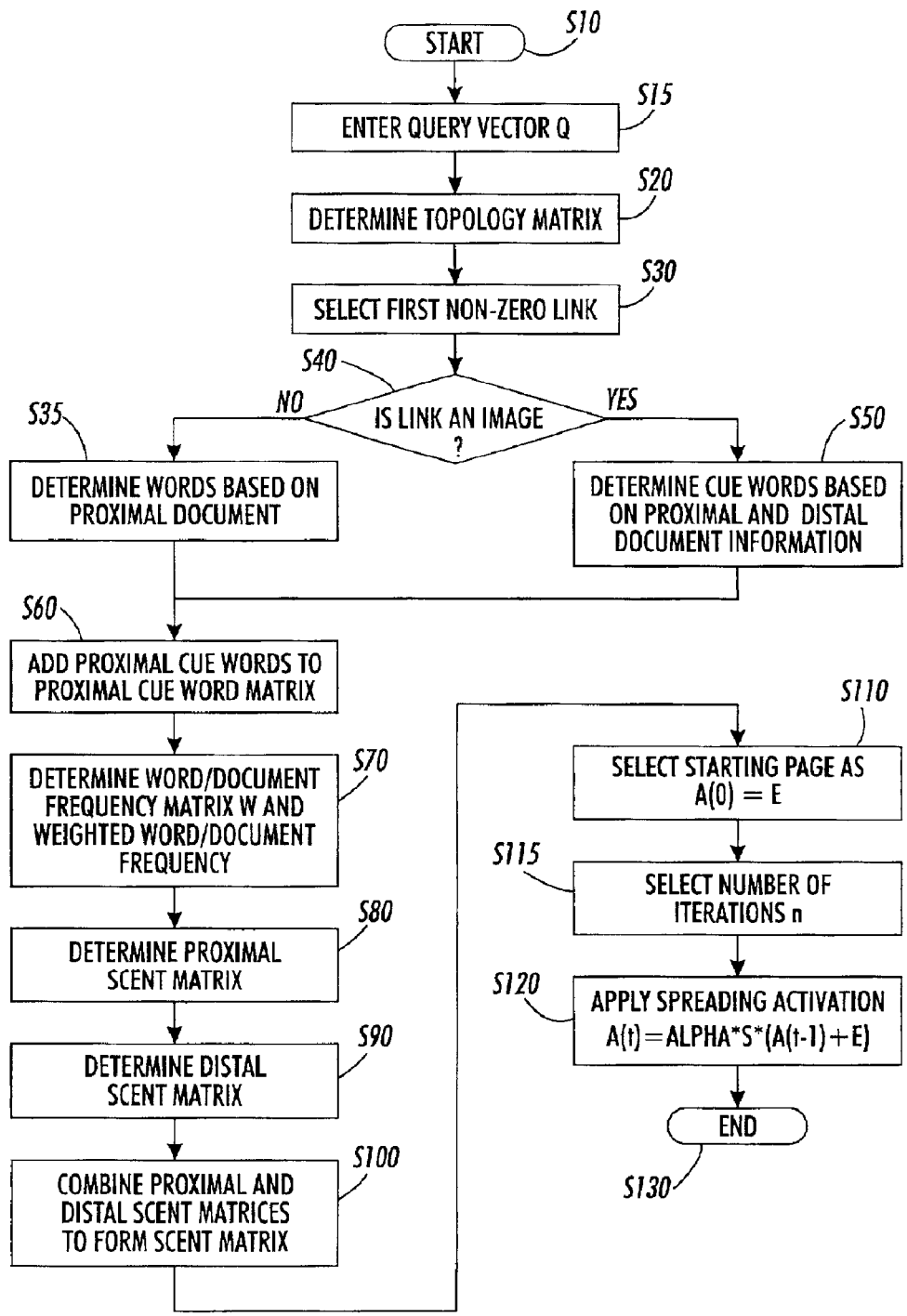
FIG. 2 is a flowchart of an exemplary method for predicting the usage of a web site according to this invention.

FIG. 2 shows a flowchart of an exemplary method for predicting the usage of a web site according to this invention. The process starts at step S10 and immediately continues to step S15 where the user's information needs are entered in the form of the query. A query vector representing the words appearing in the query is generated. Control then continues to step S20. In step S20, the topology matrix for the document collection or web site is determined. In the exemplary embodiment, the topology matrix encodes information describing the links that exist between documents or web pages to be analyzed. The exemplary embodiment shows a matrix encoding the information. However, it will be apparent that any type of data structure such as matrices, adjacency lists or any other known or later developed data structure capable of indicating the relationship between entries may be used in the practice of this invention.

In step S30, the first non-zero link in the topology matrix is selected. The topology matrix encodes information describing which documents, or web pages contain links to other documents or web pages. Therefore, documents containing relevant links are easily identified. Control then continues to step S40 where a determination is made whether the link structure is an image link.

Image links present a difficult semantic analysis problem since complex image analysis is necessary to determine the subject of the image. The proximal cue words surrounding a link frequently provide some cue words. However, if no proximal cue words can be determined then cue words from the distal document can be used. If it is determined in step S40 that the link structure is an image link, control continues to step S50. If it is determined that the link structure is not an image link, control continues to step S35.

In step S35, the link indicated by the non-zero topology matrix entry is analyzed for proximal cue words. Proximal cue words include for example, the text of the link structure. For links including characters such as '/' and '.', the characters may be used as word boundary markers and each portion of the text added to the list of proximal cue words. Text surrounding the link structure may also be added, the title of the proximal page as well as features such as where the link is found within the document. It will be apparent that any feature of the proximal document or web page may be used to provide proximal cue words in the practice of this invention. Control then continues to step S60.

If the image determination step S40 indicates that the link structure is an image, control continues to step S50. In step S50, the cue words on the distal document or web page may be used to provide additional cue words for the image link structure. In the exemplary embodiment of this invention, proximal cue words for the link are determined from the link, the text surrounding the link, the title of the distal document and/or the text of the distal document, either alone or in combination. If the distal document or web page cue words are insufficient, the image filename used in naming the image link structure can also be used to provide cue words. Control then continues to step S60.

The proximal cue words are then added to the proximal cue word matrix K in step S60. The proximal cue word matrix K stores information about which words are associated with which links. Each link in the keyword matrix represented by a row entry is associated with a respective proximal cue word. Each link in the set of links has an entry associated with each respective cue word.

Control then continues to step S70 where the word/ document frequency matrix is determined W. The word/ document frequency matrix indicates how frequently a word as indicated by a column entry appears in the document specified by the row entry. The weighted word/document frequency is then determined using term frequency, inverse document frequency, term frequency, log of term frequency, $(1+\log_{10})$ of term frequency or any other known or later developed technique of weighting. Control continues to step S80 where the proximal scent matrix is determined.

Figure 3:
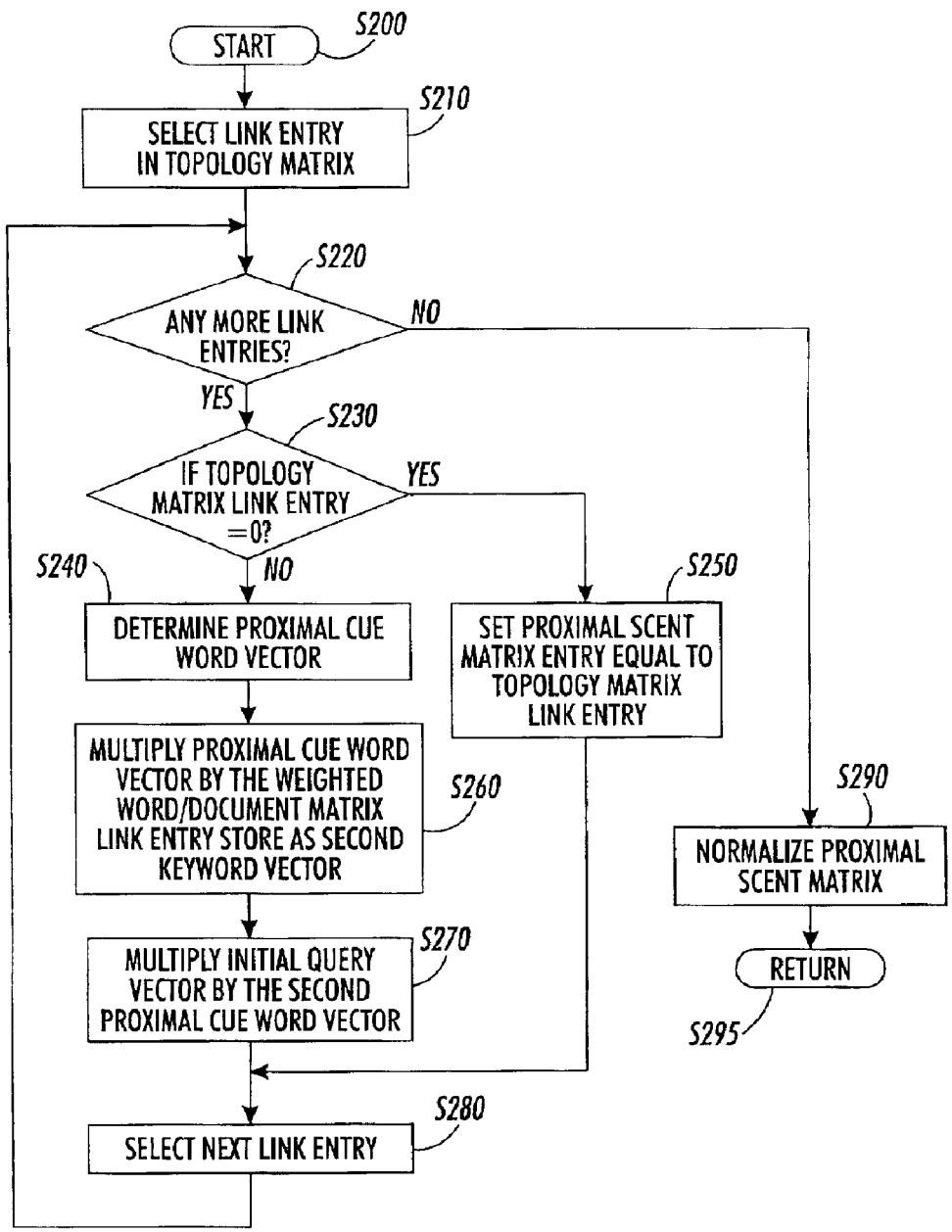
FIG. 3 is a flowchart of an expanded view of an exemplary method for determining proximal scent according to this invention.

An expanded view of the determination of the proximal scent matrix is discussed in relation to FIG. 3. After the proximal scent matrix is determined in step S80 control continues to step S90 where the distal scent matrix is determined. An expanded view of the determination of the distal scent matrix is discussed in relation to FIG. 4. Control then continues to step S100 where the proximal and distal scent matrices may be combined. In the exemplary embodiment of this invention, when a distal scent matrix entry is not zero and the proximal scent matrix is zero, the distal scent matrix entry may be substituted into the proximal scent matrix entry. In this way, the distal scent matrix provides information which is not available through the proximal scent matrix. For example, the combined scent matrix may represent any combination of the distal and proximal scent matrices as shown in equation 2. Control then continues to step S110.

$$\text{Scent}=a*\text{Proximal\_Scent}+b*\text{Distal\_Scent}. \quad (2)$$

In step S110 a starting page for spreading activation is selected. The starting page is represented by a vector E. For example, E={1 0 0 0 0 0 0} represents the starting page P0 in the exemplary document collection or web site of FIG. 6. Control then continues to step S120 and the spreading activation iteration begins.

Spreading activation is applied or iterated 'n' times in step S120. In each iteration of spreading activation, the parameter alpha indicates the percentage of users who will follow the through to the next link. Accordingly, each iteration of the spreading activation models the probability that a user with information needs represented by the query vector Q, starting at page E will traverse the indicated pages. In this way a prediction of the usage of a web site by a user having the indicated information needs and starting point is obtained. When the spreading activation has iterated 'n' times, control continues to step S130 and the process ends.

FIG. 3 shows an expanded view of the exemplary method for calculating proximal scent according to this invention. The process starts at step S200 and continues immediately to step S210.

In step S210, the first entry in the topology matrix T is selected and control continues to step S220. In step S220, a determination is made as to whether any topology entries remain to be analyzed.

If it is determined that no further link entries remain to be analyzed, control is transferred to step S290 where the proximal scent matrix is normalized. Normalization of the matrix is achieved by performing elementary column operations on the matrix columns to ensure the columns sum to one. Control then continues to step S295 and control is returned to the calling step S80 of FIG. 2.

If the determination is made that further entries remain in the topology matrix, control continues to step S230. In step S230 a determination is made whether the topology matrix entry contains a zero value. A zero value in the topology matrix indicates that no link exists. If the determination indicates the topology entry is zero, control is transferred to step S250, otherwise control is transferred to step S240. In the exemplary embodiment of this invention, a zero value indicates no link exists. However, it will be apparent that any value, such as a negative number may be used that indicates no link exits in the topology matrix.

If control is transferred to step S250, the proximal scent matrix entry corresponding to the topology entry is set equal to zero since no information scent can be transferred along a non-existent link. Control then continues to step S280.

the determination in step S230 indicates that the topology entry is not zero, then control continues to step S240. In step S240, the proximal cue word vector associated with the link is determined from proximal cue word matrix K. The proximal cue word vector stores information for all the proximal cue words associated with a given link. Control then continues to step S260 where each proximal cue word in the proximal cue word vector is multiplied by the weighted word/document frequency matrix to obtain a second weighted proximal cue word vector. Control then continues to step S270 where the similarity of the second weighted proximal cue word vector to the initial query vector is determined. As discussed above, the initial query vector indicates the user's information needs. In the exemplary embodiment, similarity is multiplying the second weighted proximal cue word vector by the initial query vector. However, it will be apparent that in various other exemplary embodiments, similarity may be determined by for example, using the cosine between vectors, or any other known or later developed technique of determining similarity. Control then continues to step S280.

In step S280, the next entry in the topology matrix is selected. Control then continues to step S220 where the process repeats until a determination is made in step S220 that no topology link entries remain to be analyzed and control is transferred to step S290 where the proximal scent matrix is normalized. Normalization of the matrix is achieved by performing elementary column operations on the matrix columns to ensure the columns sum to one. Control then continues to step S295 and control is returned to the calling step S80 of FIG. 2.

Figure 4:
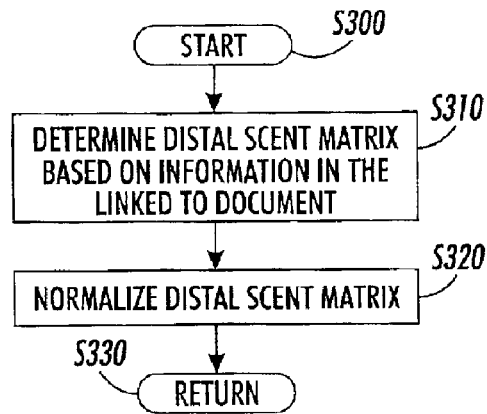
FIG. 4 is a flowchart of an expanded view of an exemplary method for determining distal scent according to this invention.

FIG. 4 shows an expanded view of an exemplary method of determining distal scent according to this invention. The process begins at step S300 where control is immediately transferred to step S310.

In step S310, a distal scent matrix is determined. Cue words are determined based on the information content of the distal or connected to document or web page as further discussed in Co-pending application Ser. No. 09/540,976 incorporated above. Control then continues to step S320.

In step S320 the distal scent matrix is normalized so that the sum of the columns in the matrix equals one. This indicates that the probabilities of the respective path transitions through the collection of documents or web pages. Control then continues to step S330 where the process is returned to the calling step S90 of FIG. 2.

Figure 5:
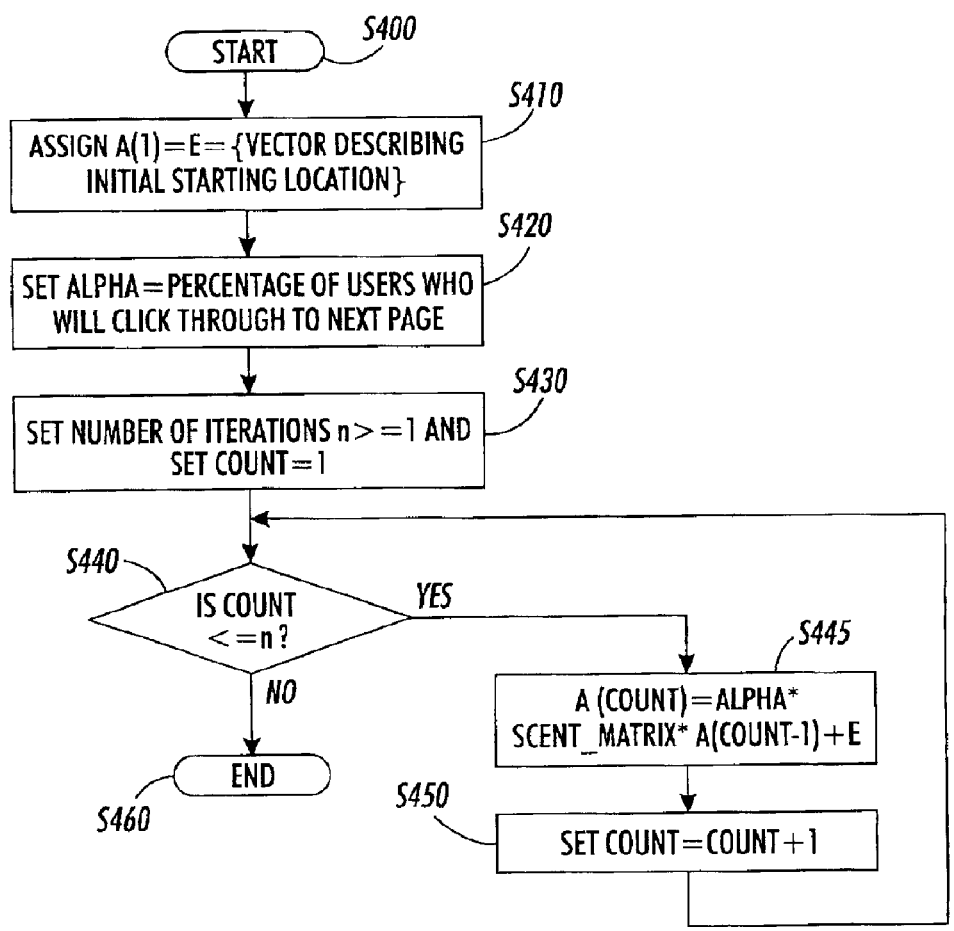
FIG. 5 is an expanded view of an exemplary method of spreading activation according to this invention.

FIG. 5 shows an expanded view of an exemplary method of spreading activation according to this invention. The process begins at step S400 and control is immediately transferred to step S410.

In step S410, the initial starting document or web page is stored as the vector E. The initial vector is defined as the first iteration of the spreading activation network. Control then continues to step S420.

In step S420, the alpha parameter is set. The alpha parameter signifies the percentage of users who click through or traverse each link. Control then continues to step S430 where the number of iterations of spreading activation is entered and the activation counter is set to one. Control then continues to step S440.

In step S440, a determination is made as to whether the count is greater than or equal to the number of iterations selected in step S430. If the count is less than the number of iterations selected, control jumps to step S445. In step S445, a new activation is determined by applying the following formula (2).

$$A(COUNT)=ALPHA*(Scent\_Matrix)*A(COUNT-1)+E \quad (3)$$

Control then continues to step S450 where the count in incremented and the process repeats until the determination in step S440 indicates the count value is greater than or equal to 'n'. If the count is determined to be greater than or equal to 'n' then control jumps to step S460 and the process ends.

Figures 6, 7:
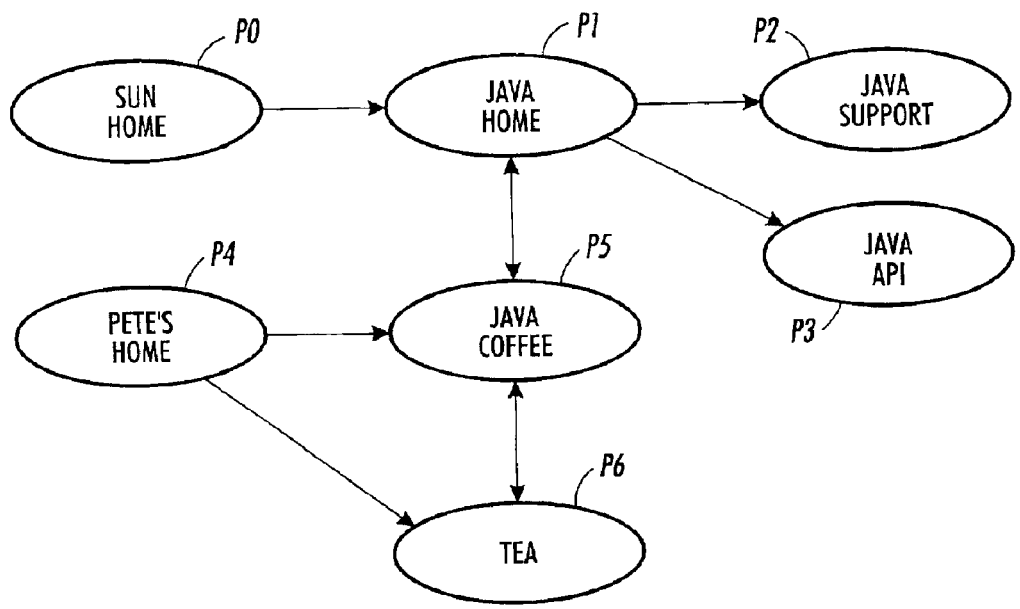
FIG. 6 is an exemplary graph showing a set of documents to be analyzed according to this invention.
FIG. 7 is an exemplary topology matrix according to this invention.

FIG. 6 shows an exemplary graph showing the connecting links between an exemplary set of documents or web pages.

FIG. 7 shows an exemplary topology matrix T according to this invention. The topology matrix stores information about the connections between the documents or web pages. Non-zero entries in the topology matrix indicate links for which proximal and distal scent matrix entries will be calculated.

FIG. 8 shows an exemplary proximal cue word matrix K according to this invention. Each word appearing in the documents or web pages is analyzed according to term frequency/inverse document frequency criteria. Each weighted word appears as a column entry in the keyword matrix. The presence of a non-zero entry in the matrix indicates the proximal cue words associated with the link specified by the row index. Similarly, specific proximal cue words for a given link are identified by corresponding non-zero entries in the columns of the row associated with the link.

For example, row 0 indicates that the proximal cue words 'SUN' and 'HOME' appear in document P0. Similarly row 1 indicates that 'JAVA' and 'HOME' appear in document P1. Entries in row 2 indicate that the words 'JAVA' and 'SUPPORT' appear in document P2. The non-zero entries in row 3 indicate that 'JAVA' and 'API' appear in document P3. Non-zero row entries in row 4 indicate that 'HOME' and 'PETE'S' appear in document P4. Non-zero entries in row 5 indicate that 'JAVA' and 'COFFEE' appear in document P5. Finally, the non-zero entry in row 6 indicates that the document P6 contains 'TEA'. In this way a keyword matrix is formed.

In the various exemplary embodiments outlined above, the system for predicting the usage of the a web site 100 can be implemented using a programmed general purpose computer. However, the system for predicting the usage of the a web site 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 2–5 can be used to implement the system for predicting the usage of the a web site 100.

Each of the circuits 25–80 of the system for predicting the usage of the a web site 100 outlined above can be implemented as portions of a suitably programmed general purpose computer. Alternatively, circuits 25–80 of the system for predicting the usage of the a web site 100 outlined above can be implemented as physically distinct hardware circuits within an ASIC, or using a FPGA, a PDL, a PLA or a PAL, or using discrete logic elements or discrete circuit elements. The particular form each of the circuits 25–80 of the system for predicting the usage of the a web site 100 outlined above will take is a design choice and will be obvious and predicable to those skilled in the art.

Moreover, the system for predicting the usage of the a web site 100 and/or each of the various circuits discussed above can each be implemented as software routines, managers or objects executing on a programmed general purpose computer, a special purpose computer, a microprocessor or the like. In this case, the system for predicting the usage of the a web site 100 and/or each of the various circuits discussed above can each be implemented as one or more routines embedded in the communications network, as a resource residing on a server, or the like. The system for predicting the usage of the a web site 100 and the various circuits discussed above can also be implemented by physically incorporating the system for predicting the usage of the a web site 100 into a software and/or hardware system, such as the hardware and software systems of a web server.

As shown in FIG. 1, the memory, 20 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 110 shown in FIG. 1 can each be any known or later developed device or system for connecting a communication device to the system for predicting the usage of the a web site 100, including a direct cable connection, a connection over a wide area network or a local area network, a connection over an intranet, a connection over the Internet, or a connection over any other distributed processing network or system. In general, the communication link 110 can be any known or later developed connection system or structure usable to connect devices and facilitate communication Further, it should be appreciated that the communication link 110 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for predicting usage of a collection of content portions comprising:

entering a user information need, a requested user starting location and a requested number of iterations;

determining a connection topology of the collection of content portions, the connection topology including a plurality of connections, each of the plurality of connections being contained in a respective one of the content portions included in the collection of content portions and connecting the respective one of the content portions to another of the content portions;

for each connection determined, determining proximal information cue words associated with each connection, storing at least one of the proximal information cue words based on the connection;

determining a predicted user presence in the collection of content portions by determining similarity between the stored proximal information cue words and the user information need;

determining a user path from the requested user starting location to a final destination based on the user information need based on spreading activation using the predicted user presence in the collection of content portions and the requested starting location for the requested number of iterations.

2. The method of claim 1, wherein determining the proximal information cue words comprises determining information cue words forming the connection.

3. The method of claim 1, further comprising:
if a connection is determined to be an image based connection, determining information cue words from the connected to content portion, the information cue words including at least one of title, words in the connected to content portion, and using the connected to content portion information cue words as proximal cue words for the image link.

4. The method of claim 1, wherein the connection topology information is stored in a matrix.

5. The method of claim 1, wherein the information about proximal information cue words is stored in a word/document matrix.

6. The method of claim 5, further comprising:
analyzing the proximal information cue word matrix after determining the user path for the requested number of iterations.

7. The method of claim 1, further comprising:
determining a weighted term frequency for each word in the collection of content portions; and
wherein determining a predicted user presence in the collection of content portions comprises:
determining a similarity between the stored proximal information cue words, the weighted frequency for each word and the user information need.

8. The method of claim 1, wherein the collection of content portions comprises a plurality of web pages, and
each connection in the connection topology comprises a URL embedded in a first web page that links between the first web page and a second web page.

9. A system for predicting usage of a collection of content portions comprising:
a controller;
a memory;
a topology determining circuit that determines a connection topology of a collection of content portions, the connection topology including plurality of connections, each of the plurality of connections being contained in a respective one of the content portions included in the collection of content portions and connecting the respective one of the collection portions to another of the content portions;

an input/output circuit for entering a user information need, user requested starting location in the collection of content portions and a requested number of iterations;

a connection determining circuit that identifies connections between content portions;

a proximal information cue word determining circuit that determines proximal cue words for each determined connection and stores at least one of the proximal information cue words based on the connection;

a user presence predicting circuit that determines a similarity between each stored proximal information cue word and the user information need to create an information scent array;

a spreading activation circuit that determines a user path based on user requested starting location in the collection of content portions to a final destination in the collection of content portions based on spreading activation applied the requested number of iterations to the information scent array and the user requested starting location in the collection of content portions.

10. The system of claim 9, wherein the proximal information cue word determining circuit determines information cue words that form the connection.

11. The system of claim 9, further comprising:
a circuit that determines if a connection is an image based connection; and
a circuit that determines information cue words from the content portion connected to by the connection, the information cue words including at least one of title and words in the connected to content portion, and using the connected to content portion information cue words as proximal cue words for the image link.

12. The system of claim 9, further comprising a topology information memory for storing the connection topology information in a matrix.

13. The system of claim 9, further comprising a proximal information cue word memory for storing information about proximal information cue words in a word/document matrix.

14. The system of claim 13, wherein the spreading activation circuit analyzes the proximal information cue word matrix after determining the user path for the requested number of iterations.

15. The system of claim 9, further comprising:
a weighted frequency determining circuit that determines a weighted frequency for each word in the collection of content portions; and
wherein the user presence predicting circuit determines the similarity between each stored proximal cue word, each stored proximal cue word's respective weight term frequency and by the user information need.

16. The system of claim 9, wherein the collection of content portions comprises a plurality of web pages, and
each connection in the connection topology comprises a URL embedded in a first web page that links between the first web page and a second web page.

* * * * *